United States Patent
Gummuluri et al.

(10) Patent No.: US 10,070,370 B1
(45) Date of Patent: Sep. 4, 2018

(54) APPARATUS, SYSTEMS AND METHODS FOR INITIATING A CELL SELECTION

(71) Applicant: APPLE INC., Cupertino, CA (US)

(72) Inventors: Sai Kiran Gummuluri, San Jose, CA (US); Harshit Chuttani, Fremont, CA (US); Adesh Kumar, San Jose, CA (US); Jinghua Ling, Palo Alto, CA (US); Xiangpeng Jing, Palo Alto, CA (US); Rajesh Ambati, Los Altos Hills, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/612,070

(22) Filed: Jun. 2, 2017

(51) Int. Cl.
*H04W 48/12* (2009.01)
*H04W 56/00* (2009.01)
*H04W 48/08* (2009.01)
*H04W 48/20* (2009.01)
*H04W 52/02* (2009.01)
*H04W 76/02* (2009.01)
*H04W 76/10* (2018.01)
*H04W 84/04* (2009.01)

(52) U.S. Cl.
CPC .......... *H04W 48/08* (2013.01); *H04W 48/20* (2013.01); *H04W 52/028* (2013.01); *H04W 56/0015* (2013.01); *H04W 56/0035* (2013.01); *H04W 76/02* (2013.01); *H04W 76/10* (2018.02); *H04W 84/042* (2013.01)

(58) Field of Classification Search
CPC ... H04W 48/08; H04W 48/20; H04W 52/028; H04W 56/0015; H04W 56/0035; H04W 76/02; H04W 84/042
USPC .......................................................... 455/434
See application file for complete search history.

(56) References Cited

U.S. PATENT DOCUMENTS

| | | | | |
|---|---|---|---|---|
| 2006/0099943 | A1* | 5/2006 | Koo ..................... | H04W 48/16 455/432.1 |
| 2011/0002262 | A1* | 1/2011 | Wang .................... | H04L 1/1812 370/328 |
| 2013/0157662 | A1* | 6/2013 | Han ...................... | H04W 48/18 455/436 |
| 2015/0341884 | A1* | 11/2015 | Das ................... | H04W 56/0035 370/311 |
| 2017/0118758 | A1* | 4/2017 | Li ........................ | H04W 16/14 |
| 2017/0135005 | A1* | 5/2017 | Basu Mallick ....... | H04W 48/16 |
| 2017/0251445 | A1* | 8/2017 | Du ....................... | H04W 48/10 |
| 2017/0290018 | A1* | 10/2017 | Darwood .......... | H04W 72/0453 |

* cited by examiner

*Primary Examiner* — Nathan Taylor
(74) *Attorney, Agent, or Firm* — Fay Kaplun & Marcin, LLP

(57) ABSTRACT

A device, system and method for initiating cell selection. The method is performed at a device connected to a network and camped on a first cell of the network. The method includes determining whether the device has successfully synchronized with the first cell. When the device is unable to synchronize with the first cell, the method includes determining whether at least one further cell satisfies predetermined reselection criteria and determining whether the at least one further cell satisfies initial cell selection criteria. When the at least one further cell satisfies the initial cell selection criteria, the method includes initiating an initial cell selection.

18 Claims, 4 Drawing Sheets

APPARATUS, SYSTEMS AND METHODS FOR INITIATING A CELL SELECTION

BACKGROUND

A user equipment (UE) may be configured to establish a connection to at least one of a plurality of different networks or types of networks to perform a variety of different functionalities via the network connection. To establish the connection, the UE may camp on a cell of a corresponding network. However, if the UE is unable to synchronize with the cell the UE is currently camped on, the UE may experience periods of no service or limited service where the UE cannot perform the full scope of functionalities normally available to the UE via the network connection.

Conventionally, while the UE is not exchanging data with the cell the UE is currently camped on (e.g. idle mode), the UE may perform measurements of the cells in the surrounding area. The UE may also be able to measure the connection between the UE and the cell the UE is currently camped on. Based on a comparison of these measurements to certain predetermined criteria, the UE may select a different cell to camp on. However, the UE may be unable to select a different cell to camp on if the predetermined criteria are not met.

Therefore, under conventional systems, the UE may remain camped on a cell that provides no service or limited service if the UE is unable to satisfy the criteria required to allow the UE to select a different cell to camp on. Accordingly, the following exemplary embodiments provide a solution for a UE to avoid being stuck on a cell that provides no service or limited service.

SUMMARY

The exemplary embodiments describe a method performed by a user equipment connected to a network and camped on a first cell. The method includes determining whether the user equipment has successfully synchronized with the first cell, determining whether at least one further cell satisfies predetermined cell reselection criteria and determining whether the at least one further cell satisfies initial cell selection criteria. Further, the method includes initiating initial cell selection when the UE has not successfully synchronized with the first cell and the at least one further cell satisfies the initial cell selection criteria.

According to another exemplary embodiment, a user equipment has a transceiver configured to establish a first connection with a first cell and a second connection with at least one further cell. The user equipment has a baseband processor connected to the transceiver configured to determine whether the user equipment has successfully synchronized with the first cell, determine whether the at least one further cell satisfies predetermined reselection criteria and determine whether the at least one further cell satisfies initial cell selection criteria. The user equipment has an application processor configured to cause the baseband processor to perform initial cell selection when the user equipment has not successfully synchronized with the first cell and the at least one further cell satisfies the initial cell selection criteria. The application processor causes the baseband processor to perform initial cell selection by deactivating the baseband processor then activating the baseband processor.

According to a further exemplary embodiment, an integrated circuit has circuitry to determine whether a user equipment has successfully synchronized with a first cell on which the user equipment is currently camped, circuitry to determine whether at least one further cell satisfies predetermined cell reselection criteria, circuitry to determine whether the at least one further cell satisfies initial cell selection criteria and circuitry to initiate initial cell selection when the user equipment has not successfully synchronized with the first cell and the at least one further cell satisfies the initial cell selection criteria.

DETAILED DESCRIPTION

Figure 1:
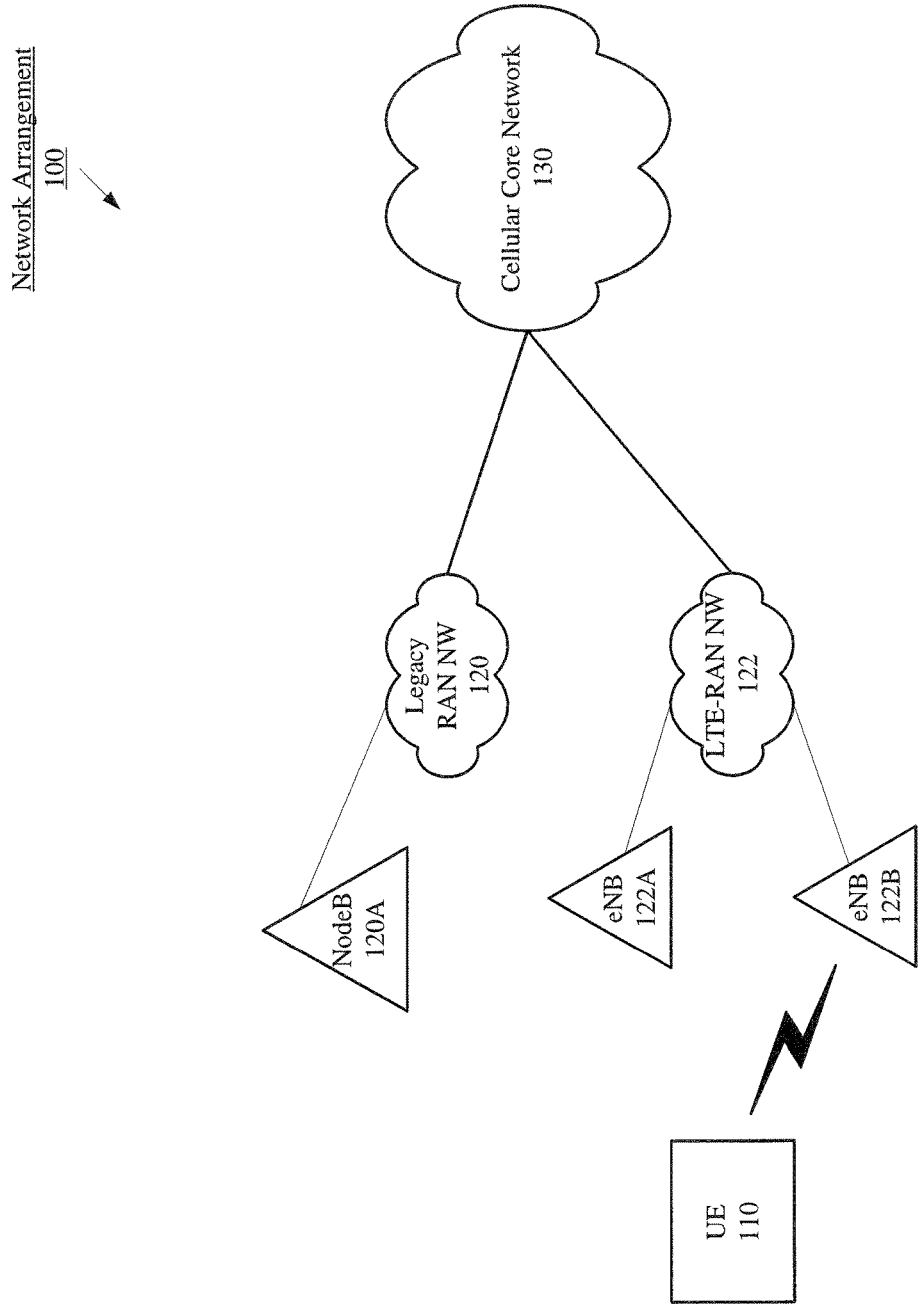
FIG. 1 shows an exemplary network arrangement according to various embodiments described herein.

The exemplary embodiments may be further understood with reference to the following description and the appended drawings, wherein like elements are referred to with the same reference numerals. The exemplary embodiments describe an apparatus, system and method for a UE to perform cell selection and camp on an alternative cell when the UE is camped on a cell that provides either no service or limited service and the UE is unable to perform cell reselection. Specifically, the UE may be unable to synchronize with the cell the UE is currently camped on. Further, although the UE may determine that another cell may provide the UE with improved service, neither the characteristics corresponding to the connection between the UE and the cell the UE is currently camped on or the characteristics corresponding to a potential connection between the UE and an alternative cell satisfies the predetermined criteria required to trigger cell reselection. Thus, from a service perspective, the UE may be stuck camping on a cell that provides either no service or limited service. To connect with the cell that would provide the improved service the application processor of the UE may deactivate the baseband processor of the UE, then reactivate the baseband processor to allow the UE to perform cell selection and camp on the cell that provides the improved service. Accordingly, the exemplary embodiments described herein provide a mechanism for a UE to initiate cell selection when the UE is stuck camping on a cell that provides either no service or limited service.

Initially, it is noted that the exemplary embodiments are described with regard to a UE after the UE has been powered on and connected to a first network. Thus, the exemplary embodiments may relate to a UE that is currently camped on a first cell of a first network. The first cell of the first network merely refers to the cell the UE is currently camped on. It is not required that the first cell of the first network be the initial cell the UE camps on and the UE may have previously camped on a plurality of cells belonging to the first network or a plurality of cells belonging to different networks. In one example, the first network may be a Long Term Evolution (LTE) network. However, the UE may be currently camped on any type of network.

Further, the exemplary embodiments may be described with regard to the UE being unable to synchronize with the first cell of the first network. For example, in LTE, the UE may be unable to successfully utilize the random access channel (RACH) to synchronize with the first cell of the first network. Consequently, the UE may be unable to perform communication functionalities (e.g. receive calls). However the exemplary embodiments are not limited to a scenario where the UE is unable to synchronize with the cell that the UE is currently camped on and the exemplary embodiments may apply to a variety of other scenarios where the cell the UE is currently camped on provides either no service or limited service.

The exemplary embodiments may also relate to the UE being unable to initiate cell reselection. Cell reselection may refer to a mechanism that changes the cell the UE is camped on. For example, while a UE is camped on the first cell of the first network, the UE may determine measurement data corresponding to the connection between the UE and the first cell of the first network. The measurement data may be based on a single measurement, based on a plurality of measurements, derived from a measurement, derived from a plurality of measurements or based on a combination thereof. Subsequently, the UE may determine, based on the measurement data, to initiate cell reselection and attempt to camp on an alternative cell. For example, the UE may be triggered to initiate a cell reselection process and attempt to camp on an alternative cell if the measurement data fails to satisfy a predetermined threshold. An alternative cell may refer to a second cell of the first network or a first cell of a second network. It should be noted that the use of the terms "first cell", "second cell", "first network" and "second network" are merely for illustrative purposes and there may be a plurality of further cells for each respective network and there may be a plurality of further networks.

Alternatively, the cell reselection process may be based on measurements of other cells. For instance, when the UE is camped on the first cell of the first network the UE may determine reselection measurement data that may correspond to the quality of a potential connection between the UE and an alternative cell. Subsequently, the UE may initiate cell reselection and attempt to camp on an alternative cell based on the corresponding reselection measurement data. For example, the UE may be triggered initiate cell reselection and attempt to camp on an alternative cell if the measurement data satisfies a predetermined threshold. It should be noted that cell reselection may be initiated based on the measurement data corresponding to the connection between the UE and the first cell of the first network, the reselection measurement data corresponding to a potential connection between the UE and an alternative cell or a combination thereof. It should be further noted that reference to cell reselection is for illustrative purposes and other networks may refer to the process of connecting to different cells after the UE has initially camped on a particular cell in a different manner.

The exemplary embodiments described herein, provide a solution to the above noted deficiencies by initiating cell selection for a UE that may be stuck camping on a cell that provides either no service or limited service. Specifically, the UE may have determined that alternative cells can provide service and subsequently, the application processor of the UE may switch off the baseband processor of the UE to allow the UE to initiate cell selection. A person having ordinary skill in the art will understand that cell selection and cell reselection are different processes that may include different criteria. Specifically, cell selection is a process that takes place when the UE does not have a current connection to a network, e.g., when the baseband processor is powered cycled. Accordingly, by initiating cell selection, the UE may be able to camp on an alternative cell that provides service for the UE that allows the UE to be able to perform communication functionalities (e.g. receive calls).

FIG. 1 shows an exemplary network arrangement 100, according to various embodiments described herein. The exemplary network arrangement 100 includes a UE 110. The UE 110 may be any type of electronic component that is configured to communicate via a network, e.g., smartphones, tablets, phablets, embedded devices, wearables, Internet of Things (IoT) devices, etc. It should also be understood that a network arrangement may include any number of UEs and the use of a single UE 110 is only provided for illustrative purposes.

In this example, each network is a wireless network with which the UE 110 may communicate wirelessly. However, it should be understood that the UE 110 may also communicate with other types of networks using a wired connection. Again, the use of two networks is only exemplary and there may be any other number of networks with which the UE 110 may communicate depending on the chipsets that are provided in the UE 110. Thus, the UE 110 may be configured to communicate directly with one or more networks. In this example, the networks with which the UE 110 may communicate are a legacy radio access network (RAN) 120 and a Long Term Evolution ("LTE") radio access network (LTE-RAN) network 122. As will be described in detail below, the legacy RAN network 120 may refer to a plurality of different types of networks. Further, the LTE RAN network 122 and the legacy RAN network are considered different types of networks. Each of these different types of networks may be termed radio access technologies ("RATs".)

LTE is defined as a standard for wireless communication of high-speed data for mobile phones and data terminals and has been described as a natural upgrade path for carriers using prior generation networks or legacy protocols, such as global System for Mobile Communications/Universal Mobile Telecommunications System ("GSM/UMTS") protocols and Code Division Multiple Access ("CDMA") 2000 1× (e.g., 1×RTT or simply "1×") wireless communication protocols.

Legacy RAN 120 and the LTE-RAN 122 are portions of cellular networks that may be deployed by cellular providers (e.g., Verizon, AT&T, Sprint, T-Mobile, etc.). These networks 120 and 122 may include, for example, a plurality of cells or base stations (Node Bs, eNodeBs, HeNBs, etc.) that are configured to send and receive traffic from UEs that are equipped with the appropriate cellular chip set. Examples of the legacy RAN 120 may include those networks that are generally labeled as 2G and/or 3G networks and may include circuit switched voice calls and packet switched data operations. Each network may be a Public Land Mobile Network (PLMN). The PLMN is a regulatory term used in telecommunications representing a network established and operated by an administration or by a recognized operating agency for the specific purpose of providing land mobile telecommunications services to the public. The PLMN may include an operating area operating on a predetermined channel and utilizing a predetermined RAT (and/or band and/or channel). Once the UE has identified the available networks in the location that the UE is disposed, the UE may join a network in the given area by using a PLMN selection process.

As stated above, the legacy RAN 120 may include GSM or UMTS protocols and CDMA wireless communication protocols. It should be noted that UMTS may refer to Wide Band Code Division Multiple Access (WCDMA) wireless communication protocols and the term WCMDA may be used interchangeably with the term UMTS. Those skilled in the art will understand that the cellular providers may also deploy other types of networks, including further evolutions of the cellular standards, within their cellular networks (e.g. 5G networks).

The network arrangement 100 may also include a cellular core network 130. The cellular core network 130, the legacy RAN 120 and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc.

Figure 2:
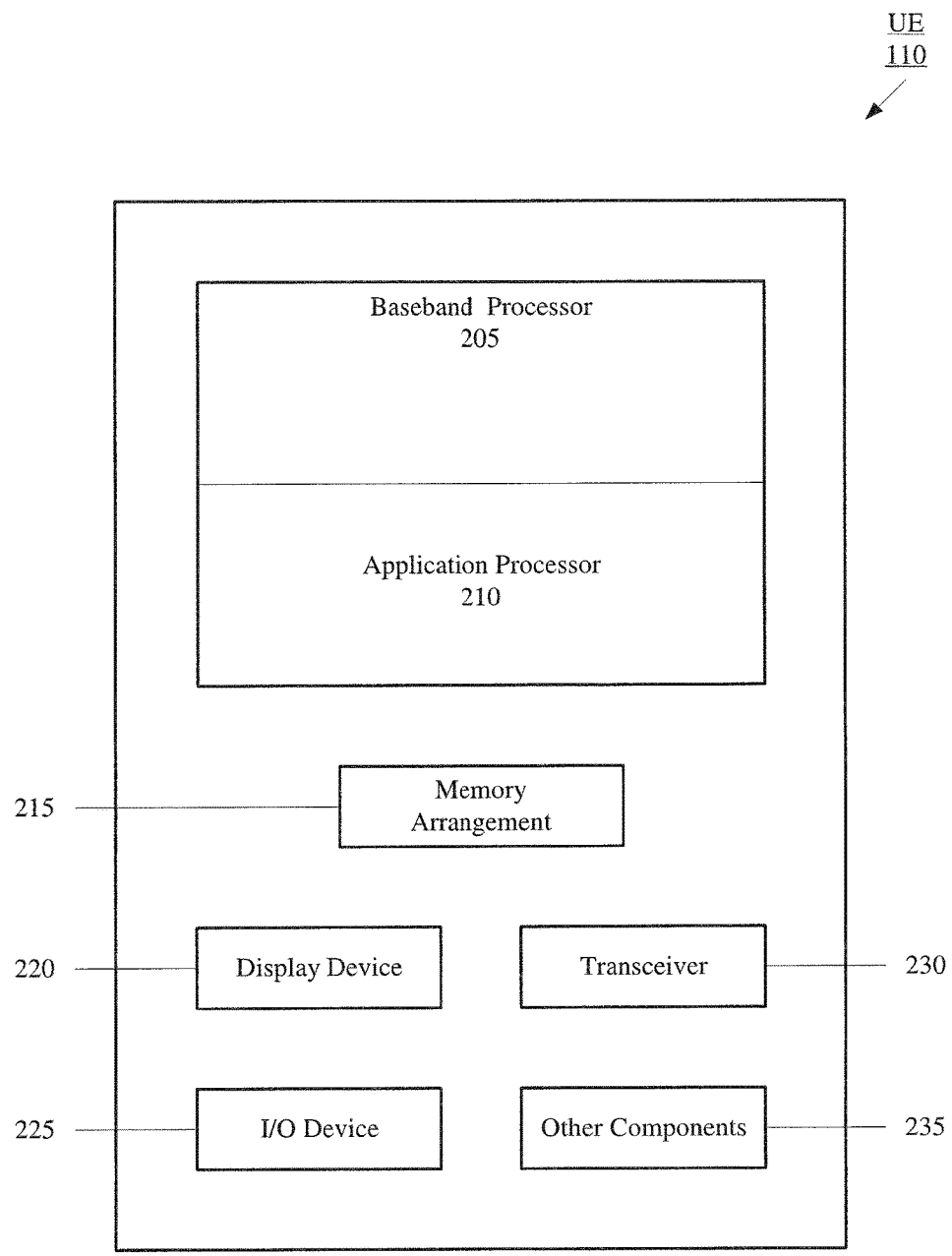
FIG. 2 shows an exemplary user equipment (UE) according to various embodiments described herein.

FIG. 2 shows an exemplary UE 110 according to various exemplary embodiments described herein. The UE 110 may be any electronic device that is configured to connect to a network and perform wireless functionalities. For example, the UE 110 may be a portable device such as a phone, a smartphone, a tablet, a phablet, a laptop, a wearable computing device, an Internet of Things (IoT) device, etc. In another example, the UE 110 may be a stationary device such as a desktop terminal.

The UE 110 may include an antenna (not shown) connected to a transceiver 230 that is connected to a baseband processor 205. The baseband processor 205 may manage the radio functions of the UE 110. The UE 110 further include an application processor 210 which may manage application processing for the UE 110. Further, the application processor 210 may be able to activate and deactivate the baseband processor 205. It should be noted that the application processor 205 may manage all the functions that are not managed by the baseband processor 205. Alternatively, the UE 110 may include a plurality of further processors to manage other functions (e.g. display and power management). It should be further noted that while the exemplary UE 110 includes multiple processors a single processor may perform all of the functions of the individual processors and the use of a plurality of processors is merely for illustrative purposes. Additionally, a person having ordinary skill in the art would understand that any processor included in the UE 110 may be incorporated in, for example, an integrated circuit or chip.

The exemplary UE 110 may further include a display device 220, an I/O device 225 and a memory arrangement 215. Those skilled in the art will understand that the UE 100 may also include additional components 235, for example, a Bluetooth transceiver, further input devices (e.g., a keypad, a touchscreen, etc.), a battery, etc. The memory arrangement 215 may be a hardware component configured to store data related to operations performed by the UE 110. The display device 220 may be a hardware component configured to show data to a user while the I/O device 225 may be a hardware component that enables the user to enter inputs. It should be noted that the display device 220 and the I/O device 225 may be separate components or integrated together such as a touchscreen.

The transceiver 230 may be a hardware component configured to transmit and/or receive data. For example, the transceiver may be used to exchange data with cells (Node Bs, eNodeBs, HeNBs, etc.) that are configured to send and receive traffic from UEs that are equipped with the appropriate cellular chip set including the control information. Thus, the baseband processor 205 and the transceiver 230 may enable communication with a network, such as Legacy-RAN 120 and LTE-RAN 122, as shown in FIG. 1, or with other electronic devices directly or indirectly through the particular network that the UE 110 is connected.

As mentioned above, the exemplary embodiments may relate to a UE that is unable to synchronize with the cell the UE is currently camped on and unable to initiate cell reselection.

The operating states of the UE 110 when it is camped on a cell of a network may be characterized as RRC idle state and RRC connected state. RRC refers to the radio resource control (RRC) protocols. Those skilled in the art will understand that when the UE 110 is in a RRC connected state, the UE 110 may be exchanging data with the connected network. For example, if the UE 110 is connected to the LTE-RAN 122 and in the RRC connected state, the UE 110 may exchange data associated with the connection that the UE 110 has established with the LTE-RAN 122 via a cell (e.g., an eNB) and thus the UE 110 is able to perform an operation that requires the exchange of data with the LTE-RAN 122 such as a communication functionality (e.g. receive calls). Further, those skilled in the art will understand that when the UE 110 is connected to the LTE-RAN 122 and in RRC idle state the UE 110 is operating in a low power state where the UE 110 is not exchanging data with the network and radio resources are not being assigned to the UE 110 within the network. However, when the UE 110 is operating in RRC idle state the UE 110 may listen to control channel broadcasts.

While the UE 110 is camped on a cell of a network the UE 110 may transition between the RRC operating states. For example, when the UE 110 is camped on a first cell of a first network in a RRC idle state, the UE 110 may not be able to exchange data with the network. To exchange data with the network the UE 110 may synchronize with the first cell of the first network and transition from RRC idle state to RRC connected state. Specifically, while in RRC idle state the UE 110 may listen to control channel broadcasts for information such as paging notifications of inbound traffic from the network. In response to the paging notification, the UE 110 may issue a request via the random access channel (RACH) to the network that indicates that the UE 110 wants to be moved to the RRC connected state. The successful transition of the UE 110 from RRC idle state to RRC connected state may include the exchange of messages between the UE 110 and the first cell of the first network. Once the transition to RRC connected state is complete, a network context is established between the first cell of the first network and the UE 110. Thus, the UE 110 may be assigned radio resources and the UE 110 may be able to exchange data with the network.

It should be noted that the exemplary embodiments are not limited to only RRC connected state and RRC idle state. For example, when the UE 110 is operating within a WCDMA network, the RRC operating states may include an operating state that corresponds to the forward access channel (FACH). A UE 110 operating in a FACH state may be is similar to an RRC connected state, however, in this state the UE 110 utilizes shared channels to transmit information.

However, as mentioned above, the UE 110 may be unable to synchronize with the cell the UE 110 is currently camped on. For example, the UE 110 may not be able to synchronize with the cell the UE is currently camped on because the UE 110 may be unable to successfully complete the random access channel (RACH) procedure that may be required for synchronization. A person having ordinary skill in the art would understand that the RACH procedure includes a plurality of messages being exchanged between the UE 110 and the cell the UE 110 is currently camped on. The initial message in the RACH procedure is sent by the UE 110 to the cell the UE 110 is currently camped on via the RACH. The RACH is a shared medium utilized by the UEs within a network. The UE 110 may inform the network, via the RACH, that the UE 110 desires to connect to the network and camp on a particular cell within the network.

The RACH procedure is used to transition the UE 110 from RRC idle state to RRC connected state. The inability of the UE 110 to transition from RRC idle state to RRC connected state may be due to the RACH. Specifically, messages from different UEs using the RACH may collide because the RACH is a shared medium. The collisions may prevent requests by the UE 110 to the network regarding the UE 110 transitioning from the RRC idle state to the RRC connected state from being processed by the network. Thus, the UE 110 may be unable to synchronize with the cell the UE is currently camped on. Additionally, the UE 110 may also be unable to synchronize with the cell the UE 110 is currently camped on if the RACH cannot be successfully utilized to remedy scenarios such as when uplink data transfer synchronization is lost or when RRC connection reestablishment is required.

The scenarios described above pertaining to the RACH and the RACH procedure are merely for illustrative purposes and are not the only scenarios in which the UE may be unable to synchronize with the cell the UE is currently camped on. For instance, if a cell is operating within a WCDMA network the UE 110 may be unable to synchronize with a cell the UE is currently camped on due to the FACH being out of service. A FACH that is out of service may refer to a scenario where the cell the UE 110 is currently camped on does not meet a predetermined criteria and the UE 110 is unable to determine any alternative cell that may meet a predetermined criteria. Further, the inability of the UE 110 to synchronize with the cell the UE 110 is currently camped on may be based on a variety of other factors including issues corresponding to the connection between the UE 110 and the cell the UE 110 is currently camped on, issues corresponding to the protocol stack, interference from other types of connections (e.g. WiFi, Bluetooth, etc.) or anything else that prevents the UE 110 from being able to synchronize with the cell the UE 110 is currently camped on. It should also be noted that the exemplary embodiments are not limited to synchronization and may apply to any scenario where the UE 110 is currently camped on a cell that provides either no service or limited service.

The exemplary embodiments may also relate to the UE 110 being unable to initiate cell reselection. Cell reselection refers to a mechanism where the cell the UE 110 is camped on is changed. For example, the mechanism may change the UE 110 from being camped on the first cell of the first network to being camped on a second cell of the first network or a first cell of a second network.

Cell reselection may be triggered based on measurements or indications regarding the quality of the connection between the UE 110 and the first cell of the first network. Further, cell reselection may also be triggered based on reselection measurements corresponding to alternative cells belonging either to the first network or an alternative network. Thus, the UE 110 may attempt to initiate cell reselection if the measurements or indications regarding the quality of the connection between the UE 110 and the first cell of the first network do not satisfy a predetermined criteria or if reselection measurements corresponding to alternative cells do not satisfy a predetermined criteria. It should be noted that the UE 110 may perform these reselection measurements while the UE 110 is operating in a RRC idle state.

The UE 110 may be unable to initiate cell reselection even when the UE 110 is camped on a cell that provides either no service or limited service. Specifically, the UE 110 may be unable to initiate cell reselection if the measurements corresponding to the cell the UE 110 is currently camped on do not meet a certain predetermined criteria. Additionally, the UE 110 may be unable to initiate cell reselection if the measurements corresponding to alternative cells do no meet a certain predetermined criteria. Further, the UE 110 may be unable to perform cell reselection when there is an imbalance between the downlink and uplink connection. For example, an imbalance may occur when the downlink connection between the UE 110 and the cell the UE 110 is currently camped on is being used to send data to the UE 110 but there are issues with the uplink connection and the UE 110 cannot use the uplink connection to reliably send data to the network. Thus, the imbalance may prevent the UE 110 from being able to perform voice operations. However, the imbalance may cause the UE 110 to determine that cell reselection is not necessary because the downlink is working properly. The exemplary embodiments are not limited to a UE 110 that is unable to perform cell reselection and the exemplary embodiments may apply to any scenario that prevents the UE 110 from being able to initiate a process that allows the UE 110 to camp on an alternative cell.

The exemplary embodiments described herein may utilize information that corresponds to cell selection. Cell selection refers to the selection of the initial cell the UE 110 camps on after the UE 110 has been powered on. Cell selection may relate to a scenario where the UE 110 is surrounded by a plurality of cells. The UE 110 may only select one cell to camp on. Therefore, cell selection relates to a process of differentiating, based on predetermined criteria, between the cells surrounding the UE 110 to select a cell that the UE 110 may camp on.

It should be noted that cell selection may include decoding master information blocks (MIBs) and decoding system information blocks (SIBs) that are transmitted by the cells. A person having ordinary skill in the art will understand the quantity and type of information contained in MIBs and SIBs.

Figure 3:
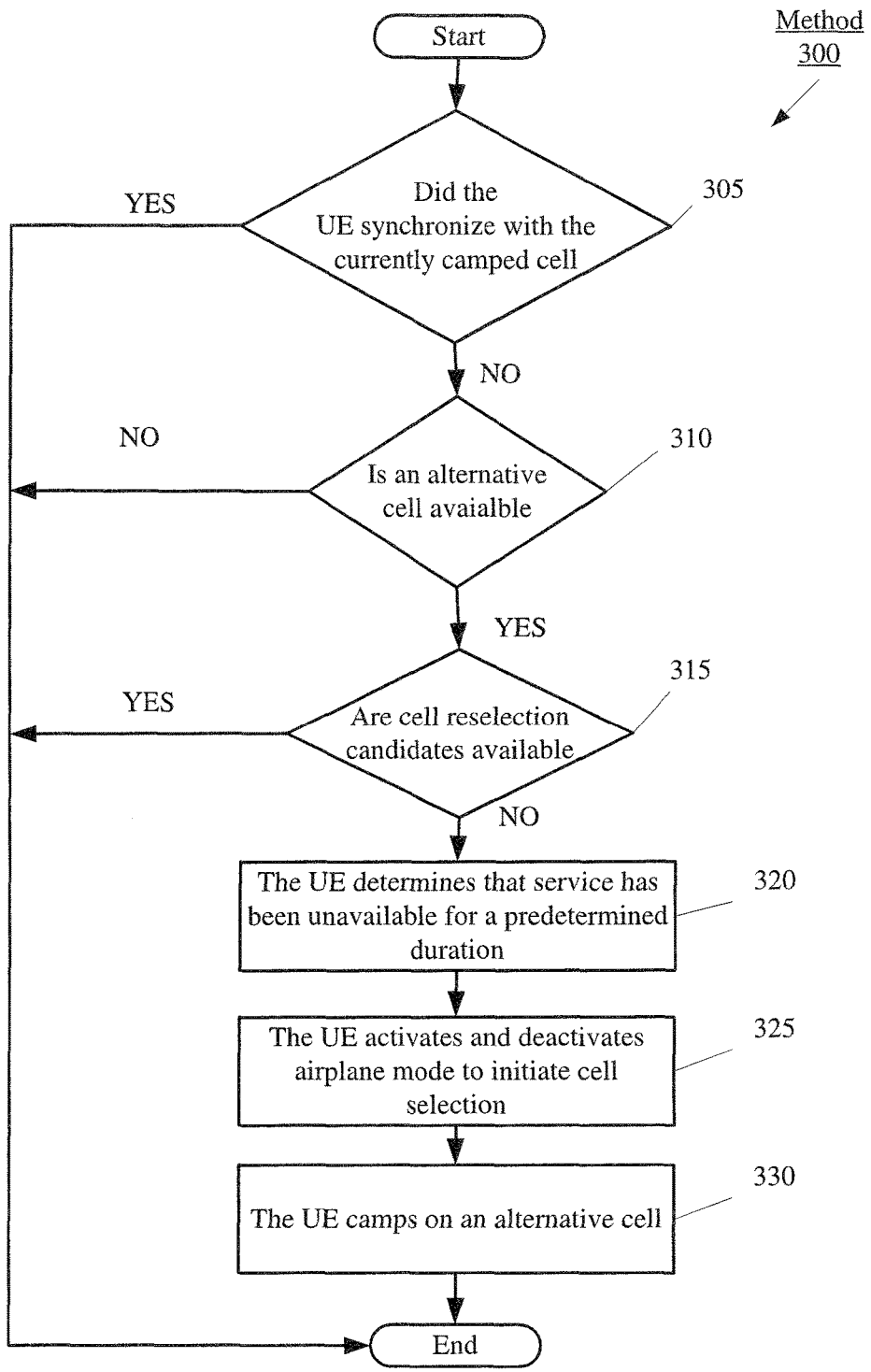
FIG. 3 shows an exemplary method for performing cell selection, according to various exemplary embodiments described herein.

FIG. 3 shows a method 300 for the UE 110 to perform cell selection according to various embodiments described herein. The method 300 relates to how the UE 110 initiates cell selection when the UE 110 is unable to perform cell reselection and camped on a cell that provides either no service or limited service. The method 300 will be described with regard to the network arrangement 100 of FIG. 1 and the UE 110 of FIG. 2.

In 305, it may be considered that the UE 110 may be currently connected to a LTE network and camped on an eNB (e.g. eNB 122B) and the UE 110 attempts to synchronize with the eNB 122B. For example, the UE 110 may want to use the RACH to transition from a RRC idle state to a RRC connected state or the UE 110 may wish to remedy the loss of uplink synchronization. If synchronization was successful then data and voice services are available and the method 300 is completed. However, if synchronization was unsuccessful, the method 300 continues to 310. It should be noted that synchronization may refer to any failure that results in the UE 110 being camped on a cell that provides either no service or limited service, including, but not limited to the failures that were described above.

In 310, the UE 110 determines if an alternative cell within the LTE network (e.g. eNB 122A) or an alternative cell within the legacy network (e.g. NodeB 120A) may provide service that exceeds the quality of the service being provided by the eNB 122B (e.g., no service or limited service). To make this determination the UE 110 may perform measurements that correspond to the characteristics of a potential connection between the UE 110 and the alternative cell. For example, the UE 110 may determine if the alternative cell is transmitting a signal with adequate signal strength to be recognized by the UE 110.

Alternatively, the UE 110 may utilize the criteria the UE 110 utilizes for initial cell selection to determine if an alternative cell may provide service that exceeds the currently camped on cell. As stated above, cell selection and cell reselection are different processes and are not analogous. The criteria for cell selection may be less than cell reselection criteria and may include, but is not limited to, characteristics that correspond to signal strength of the respective cell, characteristics that correspond to signal quality offered by the respective cell, whether the PLMN of the cell is a PLMN the UE 110 is permitted to utilize, whether the service offered by the cell is a type of service the UE 110 is permitted to utilize, etc. An example of a specific measure that may be determined during cell selection is the minimum required reception level in the cell (Qrxlevmin). Further, as stated above, cell selection may include decoding SIBs and deriving system information. However, cell selection is not limited to the criteria discussed above and different networks may utilize different criteria.

One exemplary embodiment the UE 110 may utilize for initial cell selection to determine if an alternative cell may provide service that exceeds the currently camped on cell may include storing the system information for a corresponding cell when the UE 110 is determining whether a cell is suitable for initial cell selection. The UE 110 may determine the system information by decoding SIBs or performing measurements. The UE 110 may store the system information for only the cells that were evaluated during the most recent initial cell selection process or the UE 110 may store the system information for cells that were evaluated over a plurality of initial cell selection processes. Specific system information that may be stored may include the Qrxlevmin, the physical cell identity and the E-UTRA Absolute Radio Frequency Channel Number (EARFCN). The EARFCN identifies the LTE band and carrier frequency of the corresponding cell. However, the exemplary embodiments are not limited to these types of system information and the UE 110 may store any other type of system information that corresponds to initial cell selection. The UE 110 may use the stored system information of the respective cells to determine if any of the cells may provide service that exceeds the currently camped on cell and thus, the UE 110 may make this determination faster than if the UE 110 had to actively determine if any of the alternative cells may provide service that exceeds the currently camped on cell without using stored system information.

Another exemplary embodiment may utilize the Access Stratum (AS) to determine if an alternative cell may provide service that exceeds the currently camped on cell. The AS corresponds to plurality of protocols. For example, one AS protocol may correspond to a neighbor cell search, which is the procedure for which the UE 110 acquires time and frequency synchronization with a cell and detects the cell ID of that cell. Specifically, information pertaining to neighbor cells may be provided in data received in the downlink connection as part of the AS protocol. The UE 110 may utilize the information corresponding to the AS protocol to determine if an alternative cell may provide service that exceeds the currently camped on cell. Further, the UE 110 may evaluate information corresponding to the AS protocol against the stored system information described above or against another predetermined threshold to determine if an alternative cell may provide service that exceeds the currently camped on cell.

If, in 310, the UE 110 determines that an alternative cell may provide service that exceeds the currently camped on cell the method 300 may continue to 315. The UE 110 may make this determination using any of the factors or criteria described above, individually or in combination.

In 315, the UE 110 determines if there are any cell reselection candidates. Again, as stated above, cell selection and cell reselection are different processes and are not analogous. Cell reselection criteria may exceed cell selection criteria. Here, if the UE 110 determines that there are no cell reselection candidates available the method 300 continues to 320. For example, a UE 110 may determine that there are no cell reselection candidates based on measurement data corresponding to the connection between the UE 110 and the cell the UE 110 is currently camped on or the reselection measurement data corresponding to alternative cells fails to meet a predetermined criteria. However, the method 300 is not limited to evaluating measurement data or reselection measurement data and the UE 110 may determine whether there is any reselection candidates based on any available information.

In 320, the UE 110 determines whether data and/or voice service has been unavailable for a predetermined duration. The predetermined duration may correspond to a single failure for the UE 110 to synchronize with the cell the UE 110 is currently camped on or the predetermined duration may correspond to a plurality of failures to synchronize with the cell the UE 110 is currently camped on. Alternatively, the UE 110 may set the predetermined duration to any length of time. If the service has been unavailable for the predetermined duration the method 300 continues to 325.

In 325, the UE 110 initiates airplane mode where the application processor 210 of the UE 110 deactivates the baseband processor 205 of the UE 110. By initiating airplane mode and deactivating the baseband processor 205 of the UE 110, the UE 110 will no longer be camped on the network. Subsequently, the UE 110 deactivates airplane mode which activates the baseband processor 205. Coming out of airplane mode allows the UE 110 to perform cell selection and select the best available service based on information stored in the memory of the UE 110. It should be noted that the exemplary embodiments are not limited to airplane mode and may refer to any process of deactivating and activating the baseband processor 205 to perform cell selection. The use of airplane mode allows the UE 110 to initiate cell selection and camp on an alternative cell that the UE 110 had previously determined would provide service that exceeds the currently camped on cell. The UE 110 may prioritize the order of the alternative cells in which the UE 110 may attempt to camp on based on the information determined in 310.

In 330, the UE 110 successfully completes the cell selection process initiated in 325. Accordingly, data and/or voice service may be available to UE 110 and the UE 110 is no longer stuck camping on a cell that provides no service or limited service.

As discussed above, the exemplary embodiments are not limited to scenarios where the UE 110 is currently camped on a cell that belongs to a LTE network. For example, the UE 110 may be camped on a cell that belongs to a legacy network. Specifically, the UE 110 may be currently camped on a cell that belongs to a WCDMA network.

When a UE 110 is currently camped on a cell that belongs to a WCDMA network the UE 110 may be unable to synchronize with the cell the UE 110 is currently camped on. The inability of the UE 110 being unable to synchronize with the cell may be due to the FACH being out of service. A FACH that is out of service may refer to a scenario where the cell the UE 110 is currently camped on does not meet certain criteria and the UE 110 is unable to determine any alternative cell that meets a certain criteria. However, it should be noted that synchronization issues that occur when a UE 110 is currently camped on a WCDMA cell is not limited to the issues corresponding to the FACH and a variety of other issue may occur with the other channels used within a WCDMA network that may result in a UE 110 being unable to synchronize with the cell the UE 110 is currently camped on. For example, when the UE 110 is utilizing FACH the UE 110 may still be utilizing the RACH and the UE 110 may be unable to synchronize with the cell the UE 110 is currently camped on due to an issue associated with the RACH.

Further, considering a scenario when the FACH is out of service, if the UE 110 suddenly loses a cell when the UE 110 is attempting to perform a cell update procedure, the AS attempts to perform a recovery search to transition the cell to a different operating state. However, the UE 110 is not synchronized with the cell the UE 110 is currently camped on, the UE 110 no longer has a target cell and there are no alternative cells to camp on as demonstrated by the FACH being out of service. A cell update procedure may correspond to a UE 110 from being camped on a particular cell to being camped on a alternative cell. Thus, in this scenario, the UE 110 may be stuck camping on a cell that provides no service or limited service and the UE is unable to perform cell reselection. It should be noted that the above scenario is merely for illustrative purposes and there may be a variety of other factors within a WCDMA network where the UE 110 may be stuck camping on a cell that provides no service or limited service and the UE is unable to perform cell reselection.

To solve the above noted deficiencies, the UE 110 may utilize non-access stratum (NAS) selection to trigger cell selection. NAS is part of the protocol stack. The NAS may function in RRC idle mode and perform tasks associated with PLMN selection and cell selection. For example, the NAS may maintain a list of PLMNs in priority order and evaluate reports of available PLMNs from the AS for PLMN selection. The NAS may control cell selection by indicating the RATs associated with the selected PLMN to be used in the search of a cell in the cell selection process. A person having ordinary skill in the art will understand that the NAS is not limited to functions associated with PLMN selection or cell selection and the NAS may perform a variety of other functions. The use of NAS selection to trigger initial cell selection when the UE 110 may be stuck camping on a cell that provides no service or limited service and the UE is unable to perform cell reselection prevents the protocol stack from being completely torn down and allows the UE 110 to find an alternative cell to camp on in a faster and more power efficient manner.

Figure 4:
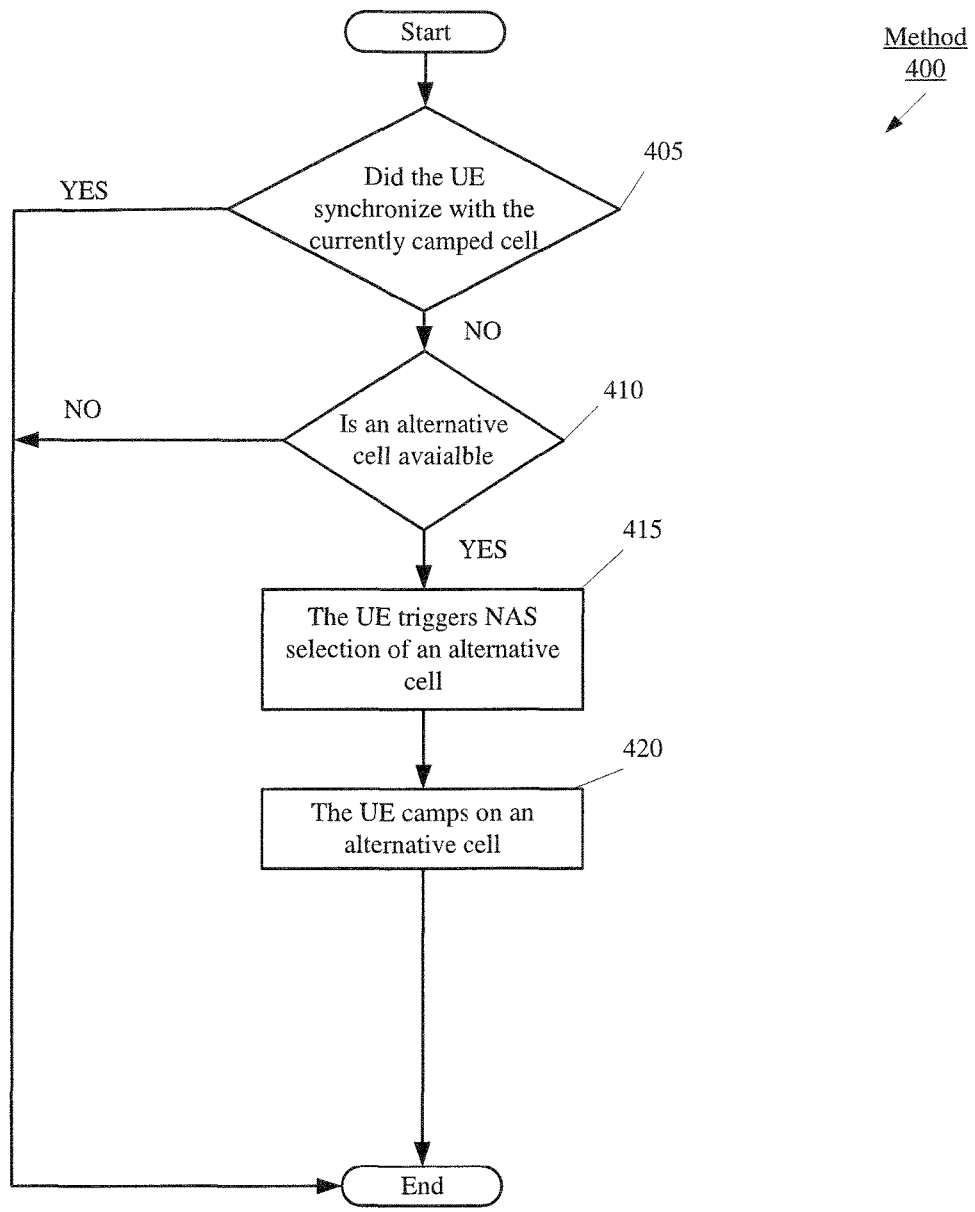
FIG. 4 shows another exemplary method for performing cell selection, according to various exemplary embodiments described herein.

FIG. 4 shows a method 400 for the UE 110 to perform NAS selection according to various embodiments described herein. The method 400 relates to how the UE 110 initiates NAS selection when the UE 110 is camped on a cell that provides no service or limited service and is unable to perform cell reselection. It should be noted that the method 400 may be described with the UE 110 initially being camped on a WCDMA cell. However, the method 400 does not require the UE 110 to be camped on a WCDMA cell and the UE 110 may be camped on any type of cell (e.g. LTE cell). Further, the method 400 will be described with regard to the network arrangement 100 of FIG. 1 and the UE 110 of FIG. 2.

In 405, the UE 110 may be stuck camping on a cell that provides no service or limited service because the UE is unable to perform cell reselection. For example, the UE 110 may be camping on a WCDMA cell. The UE 110 may be stuck camping on a cell due to the UE 110 being unable to synchronize with the cell the UE 110 is currently camped on as a result of the FACH being out of service or an issue associated with the RACH. It should be noted that the use of a WCDMA cell is merely for illustrative purposes and the UE 110 may be stuck camping on any type of cell.

In 410, the UE 110 may determine whether there are any cells that may provide service that exceeds the currently camped on cell. 410 is similar to 310 and the UE 110 may make this determination using any of the factors or criteria described above with regard to 310, individually or in combination. In 410, if the UE 110 determines that there are alternative cells that may provide service that exceeds the currently camped on cell the method 400 continues to 415.

In 415, the UE 110 triggers NAS selection. The NAS selection may be triggered after a predetermined number of RACH failures or a predetermined amount of time. Further, based on the determination made in 410 the UE 110 may determine a priority order of cells with which to attempt NAS selection and the UE 110 may give the highest priority to LTE cells. For example, the UE 110 may be stuck camping on a WCDMA cell and perform NAS selection on a LTE cell based on the priority given to the LTE cell. However, even if a UE 110 is stuck camping on a LTE cell the UE 110 may perform NAS level selection on an alternative LTE cell.

One exemplary embodiment of NAS selection may provide more efficient NAS selection by placing a maximum amount of attempts on the NAS attempt counter. The NAS attempt counter is used to limit that amount of rejected NAS selection attempts. The maximum may be based on the determination made in 410. Thus, the maximum amount of attempts may correspond to the quantity or quality of alternative cells the UE 110 has determined may provide service that exceeds the currently camped on cell. For example, the more alternative cells that provide suitable connections for the UE 110 the lower the maximum number of NAS selection attempts may be set because if the UE 110 is unable to camp on a first potentially suitable cell via NAs selection the UE 110 knows that there is still another potential NAS selection eligible cell available.

Another exemplary embodiment of NAS selection may provide more efficient NAS selection by triggering NAS selection immediately upon N300 counter expiry. The N300 represents the maximum number of RRC connection request retransmits and may be set to any value from 0 to 7.

Another exemplary embodiment of NAS selection may provide more efficient NAS selection by triggering NAS selection when the downlink block error rate (BLER) corresponding to the cell the UE is currently camped on is less than the predetermined threshold and the transmission power for the cell the UE is currently camped on is greater than or equal to the maximum transmission power level (MTPL) for a predetermined number of RACH attempts.

Another exemplary embodiment of NAS selection may provide more efficient NAS selection by triggering NAS selection based on a RACH attempt counter that is adjusted dynamically. The RACH attempt counter may be adjusted based on a number of RACH preambles transmitted, the T300 times and the N300 counter. A person having ordinary skill in the art will understand that the amount of RACH preambles transmitted corresponds to the number of RACH attempts because a RACH procedure includes initially transmitting a RACH preamble.

It should be noted that in 415, the UE 110 may trigger NAS selection to allow the UE 110 to camp on an alternative cell based on a single factor described above or a combination thereof.

In 420, the UE 110 may successfully complete the NAS selection and thus, the UE 110 successfully camps on an alternative cell. Accordingly, service to the UE 110 is restored.

The described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS X, mobile platforms having operating systems such as iOS. Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present embodiments, without departing from the spirit or the scope of the exemplary embodiments. Thus, it is intended that the exemplary embodiments cover modifications and variations provided they come within the scope of the appended claims and their equivalent. It will also be understood that the T300 timer correspond to the amount of time between the transmissions of RRC connection requests.

It is further noted that the exemplary embodiments are described with a set of conditions that are determined for the mechanism according to the exemplary embodiments to be performed. However, the set of conditions described herein are only exemplary and the set of conditions may include further criteria or omit certain criteria as used herein. Thus, the set of conditions described herein are only exemplary and those skilled in the art will understand that other conditions or sets of conditions may be utilized when a substantially similar mechanism according to the exemplary embodiments would provide the features described herein.

What is claimed is:

1. A method comprising:
    at a user equipment (UE) camped on a first cell:
       determining whether the UE has successfully synchronized with the first cell;
       determining whether at least one further cell satisfies predetermined cell reselection criteria;
       determining whether the at least one further cell satisfies initial cell selection criteria; and
       initiating an initial cell selection when the UE has not successfully synchronized with the first cell and the at least one further cell satisfies the initial cell selection criteria, wherein the initial cell selection is performed by deactivating a baseband processor of the UE then activating the baseband processor of the UE.

2. The method of claim 1, wherein deactivating the baseband processor of the UE corresponds to activating airplane mode and activating the baseband processor of the UE corresponds to deactivating airplane mode.

3. The method of claim 1, wherein initiating the initial cell selection includes performing non-access stratum (NAS) protocol cell selection.

4. The method of claim 3, wherein initiating the NAS protocol cell selection is based on at least one of a predetermined number of Random Access Channel (RACH) failures, a N300 counter expiry, a downlink block error rate (BLER) corresponding to the first cell being less than a BLER predetermined threshold and a transmission power for the first cell being greater than or equal to a maximum transmission power level (MTPL) for a predetermined number of RACH attempts, or a RACH attempt counter that is adjusted based on at least one of a number of RACH preambles transmitted, a T300 time and the N300 counter.

5. The method of claim 3, wherein performing NAS protocol cell selection includes setting a maximum amount attempts for a NAS attempt counter based on at least one characteristic of the at least one further cell.

6. The method of claim 1, further comprising:
    determining a priority order of the at least one further cell, wherein the priority order is based on the initial cell selection criteria and corresponds to the order of the at least one further cell in which the UE will initiate the initial cell selection.

7. The method of claim 6, wherein a highest priority is given to a LTE cell.

8. The method of claim 1, further comprising:
    determining system information for the at least one further cell;
    storing system information that corresponds to the initial cell selection criteria for the at least one further cell, based on the determined system information; and
    wherein determining whether the at least one further cell satisfies initial cell selection criteria includes comparing the stored system information that corresponds to initial cell selection criteria for the at least one further cell to the initial cell selection criteria.

9. The method of claim 8, wherein the system information that corresponds to the initial cell selection criteria for the at least one further cell includes a minimum required reception level in the cell (Qrxlevmin).

10. The method of claim 1, wherein initiating the initial cell selection does not require the UE to tear down the entire protocol stack.

11. A user equipment (UE), comprising:
    a transceiver configured to establish a first connection with a first cell and a second connection with at least one further cell;
    a baseband processor connected to the transceiver configured to:
       determine whether the UE has successfully synchronized with the first cell;
       determine whether the at least one further cell satisfies predetermined cell reselection criteria;
       determine whether the at least one further cell satisfies initial cell selection criteria; and
    an application processor configured to:
       cause the baseband processor to perform an initial cell selection when the UE has not successfully synchronized with the first cell and the at least one further cell satisfies the initial cell selection criteria, wherein the application processor causes the baseband processor to perform the initial cell selection by deactivating the baseband processor then activating the baseband processor.

12. The UE of claim 11, wherein the baseband processor is further configured to:
- determine system information for the at least one further cell;
- store system information that corresponds to the initial cell selection criteria for the at least one further cell, based on the determined system information; and
- wherein the determining whether the at least one further cell satisfies the initial cell selection criteria includes comparing the stored system information that corresponds to the initial cell selection criteria for the at least one further cell to the initial cell selection criteria.

13. The UE of claim 12, wherein the system information that corresponds to the initial cell selection criteria for the at least one further cell includes a minimum required reception level in the cell (Qrxlevmin).

14. The UE of claim 11, wherein determining whether the at least one further cell satisfies initial cell selection criteria is based on neighbor cell data received in a downlink connection as part of the Access Stratum (AS) protocol.

15. An integrated circuit, comprising:
- circuitry to determine whether a UE has successfully synchronized with a first cell on which the UE is currently camped;
- circuitry to determine whether at least one further cell satisfies predetermined cell reselection criteria;
- circuitry to determine whether the at least one further cell satisfies initial cell selection criteria; and
- circuitry to initiate an initial cell selection when the UE has not successfully synchronized with the first cell and the at least one further cell satisfies the initial cell selection criteria, wherein initiating the initial cell selection includes performing a non-access stratum (NAS) protocol cell selection, wherein the NAS protocol cell selection includes setting a maximum amount attempts for a NAS attempt counter based on at least one characteristic of the at least one further cell.

16. The integrated circuit of claim 15, wherein initiating the NAS protocol cell selection is determined based a downlink block error rate (BLER) corresponding to the first cell being less than a BLER predetermined threshold and a transmission power for the first cell being greater than or equal to a maximum transmission power level (MTPL) for a predetermined number of RACH attempts.

17. The integrated circuit of claim 15, wherein initiating the NAS protocol cell selection occurs after a N300 counter expiry.

18. The integrated circuit of claim 15, wherein initiating the NAS protocol cell selection is determined based on a RACH attempt counter that is adjusted based on at least one of a number of RACH preambles transmitted, a T300 time and the N300 counter.

* * * * *